(12) United States Patent
Drazic et al.

(10) Patent No.: US 7,794,092 B2
(45) Date of Patent: Sep. 14, 2010

(54) LARGE SCREEN DIGITAL IMAGE PROJECTOR

(75) Inventors: Valter Drazic, Betton (FR); Khaled Sarayeddine, Nouvoitou (FR)

(73) Assignee: Thomson Licensing, Boulogne Billancourt (FR)

( * ) Notice: Subject to any disclaimer, the term of this patent is extended or adjusted under 35 U.S.C. 154(b) by 773 days.

(21) Appl. No.: 11/631,748

(22) PCT Filed: Jul. 5, 2005

(86) PCT No.: PCT/EP2005/053208

§ 371 (c)(1),
(2), (4) Date: Jan. 5, 2007

(87) PCT Pub. No.: WO2006/003205

PCT Pub. Date: Jan. 12, 2006

(65) Prior Publication Data
US 2007/0195275 A1  Aug. 23, 2007

(30) Foreign Application Priority Data
Jul. 6, 2004  (FR) .................................. 04 51464

(51) Int. Cl.
*G03B 21/14* (2006.01)
*H04N 9/12* (2006.01)

(52) U.S. Cl. .............................. 353/84; 348/743; 353/34
(58) Field of Classification Search ...................... 353/7, 353/8, 30, 31, 34, 84, 94; 348/743
See application file for complete search history.

(56) References Cited

U.S. PATENT DOCUMENTS

| | | | | |
|---|---|---|---|---|
| 5,612,753 A | * | 3/1997 | Poradish et al. .............. 348/743 |
| 5,626,411 A | * | 5/1997 | Takahashi et al. .............. 353/94 |
| 5,765,934 A | * | 6/1998 | Okamori et al. ................ 353/94 |
| 5,812,223 A | * | 9/1998 | Noguchi ......................... 349/9 |
| 5,838,865 A | * | 11/1998 | Gulick ........................ 385/121 |
| 6,218,679 B1 | * | 4/2001 | Takahara et al. .............. 257/59 |
| 6,283,597 B1 | * | 9/2001 | Jorke ........................... 353/31 |
| 6,337,724 B1 | * | 1/2002 | Itoh et al. ..................... 349/75 |
| 6,431,709 B1 | * | 8/2002 | Tiao et al. ..................... 353/34 |

(Continued)

FOREIGN PATENT DOCUMENTS
EP  0777389  6/1997

OTHER PUBLICATIONS
Search Report Dated Sep. 27, 2005.

*Primary Examiner*—Thanh X Luu
*Assistant Examiner*—Danell L Owens
(74) *Attorney, Agent, or Firm*—Robert D. Shedd; Jeffrey M. Navon

(57) ABSTRACT

The invention relates to a projection system comprising: a polychromatic light source and at least one imaging assembly illuminated by an associated polychromatic illumination beam, and comprising:
  two separate colored wheels, respectively called first and second colored wheel; and
  three separate imagers, respectively called first, second and third imagers.

At least one part of the polychromatic beam, called first source beam, illuminating the first colored wheel which separates said source beam into a first monochromatic beam and into a two-tone beam, said first monochromatic beam illuminating the first imager and said two-tone beam being transmitted toward the second colored wheel.

The second colored wheel being illuminated by said two-tone beam and separating said two-tone beam into second and third monochromatic beams, respectively illuminating said second and third imagers respectively.

7 Claims, 9 Drawing Sheets

U.S. PATENT DOCUMENTS

| | | | |
|---|---|---|---|
| 6,540,363 B1 * | 4/2003 | Steffensmeier | 353/31 |
| 6,561,653 B2 * | 5/2003 | Belliveau | 353/31 |
| 6,575,577 B2 * | 6/2003 | Beliveau | 353/31 |
| 6,846,082 B2 * | 1/2005 | Glent-Madsen et al. | 353/94 |
| 6,857,752 B2 * | 2/2005 | Eckhardt | 353/97 |
| 6,886,943 B1 * | 5/2005 | Greenberg et al. | 353/94 |
| 6,962,414 B2 * | 11/2005 | Roth | 353/20 |
| 7,014,318 B2 * | 3/2006 | Dho | 353/31 |
| 7,077,524 B2 * | 7/2006 | Roth | 353/20 |
| 7,152,981 B2 * | 12/2006 | Eckhardt | 353/98 |
| 7,252,384 B2 * | 8/2007 | Osaka | 353/31 |
| 7,448,755 B2 * | 11/2008 | Osaka | 353/31 |
| 2002/0063854 A1 | 5/2002 | Flint | |
| 2003/0151727 A1 * | 8/2003 | Glent-Madsen et al. | 353/94 |
| 2005/0088629 A1 * | 4/2005 | Greenberg et al. | 353/94 |

* cited by examiner

PRIOR ART

Fig. 1A

PRIOR ART

LARGE SCREEN DIGITAL IMAGE PROJECTOR

This application claims the benefit, under 35 U.S.C. §365 of International Application PCT/EP2005/053208, filed Jul. 5, 2005, which was published in accordance with PCT Article 21(2) on Jan. 12, 2006 in French and which claims the benefit of French patent application No. 04 51464, filed Jul. 6, 2004.

1. FIELD OF THE INVENTION

The present invention relates to the projection of images and, more precisely, to large screen digital projection, for example of the movie theatre type.

2. TECHNOLOGICAL BACKGROUND

Figure 1A:
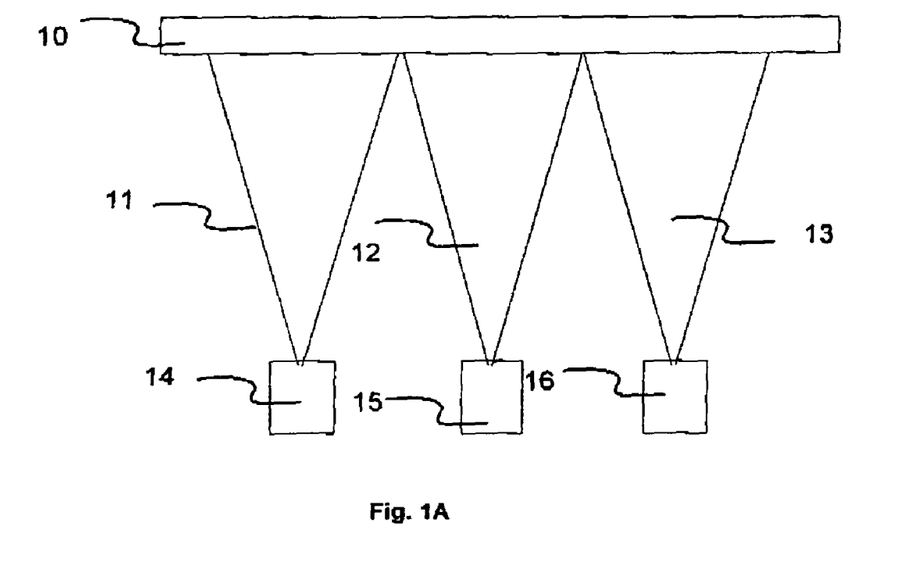
FIGS. 1A and 1B respectively illustrate a projection system known per se and images projected by the system.
Figure 1B:
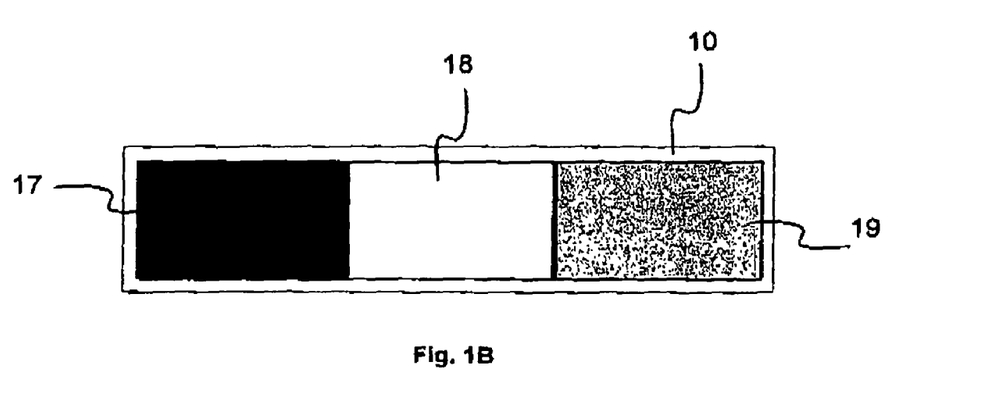

According to the prior art, in order to project a very large size of image, since a conventional projector cannot project a sufficiently bright image when a very large screen is used, several projectors are implemented such as is illustrated in FIG. 1A. Thus, digital projectors 14 to 16 each project an image onto the same screen 10. The transmitted beams 11 to 13 associated with each of the projectors 14 to 16 are adjacent to one another. Electronic processing means, that are relatively complex, allow the separation between the three projected images to be rendered invisible, as is illustrated in FIG. 1B. This technique has the drawback of not allowing a uniform brightness of the three images 17 to 19, especially when the lamps of the projectors 14 to 16 begin to age. There may also be color differences on the projected images.

3. SUMMARY OF THE INVENTION

The aim of the invention is to overcome these drawbacks of the prior art.

More particularly, the objective of the invention is to allow a digital image projection of high quality on a large-sized screen, with notably a uniform brightness.

For this purpose, the invention provides a projection system comprising a light source capable of generating a polychromatic source illumination beam, and a group of at least one imaging assembly, each of said imaging assemblies of the group being illuminated by an associated polychromatic illumination beam, and comprising:

two separate colored wheels, respectively called first and second colored wheels; and three separate imagers, respectively called first, second and third imagers;

at least one part of the polychromatic beam, called first source beam, illuminating the first colored wheel which separates the source beam into a first monochromatic beam and into a two-tone beam, the first monochromatic beam illuminating the first imager and the two-tone beam being transmitted toward the second colored wheel; and the second colored wheel being illuminated by the two-tone beam and separating the two-tone beam into second and third monochromatic beams, respectively illuminating the second and third imagers.

According to one particular feature, the imaging assembly also comprises an inclined mirror placed in the path of the third monochromatic beam.

Advantageously, the imaging assembly comprises focusing means in each of the paths of said first, second and third monochromatic beams, the focusing means each comprising a group of at least one lens and one light guide, each of the groups of at least one lens respectively focusing the first, second and third monochromatic beams onto the entry of the corresponding light guide, the exit of each of the light guides being respectively associated with the first, second and third imagers.

According to one advantageous feature, the imaging assembly comprises a group of at least one lens in the path of the two-tone beam, the group of at least one lens focusing the two-tone beam onto the second colored wheel.

Advantageously, the group of at least one imaging assembly comprises at least two imaging assemblies and polarization means separating the polychromatic source illumination beam into two separate polychromatic illumination beams respectively illuminating separate imaging assemblies.

According to one particular feature, the group of at least one imaging assembly comprises at least two imaging assemblies and semi-transparent mirrors separating the polychromatic source illumination beam into at least two separate polychromatic illumination beams respectively illuminating separate imaging assemblies.

Preferably, the semi-transparent mirrors are mirrors comprising reflecting regions and transparent regions.

According to one advantageous feature, at least one of the imaging assemblies of the group contains first, second and third optical motors respectively comprising the first, second and third imagers and first, second and third objective lenses, the imagers and lenses being positioned in such a manner as to project three images side by side onto a given projection surface.

According to another advantageous feature, at least one of the imaging assemblies of the group contains first, second and third optical motors respectively comprising the first, second and third imagers and first, second and third objective lenses, the imagers and lenses being positioned in such a manner as to project three superimposed images onto a given projection surface.

Preferably, the system comprises:

means for dividing up each image to be projected into sub-images, each of the sub-images being associated with an imager of said system; and means for selecting information representative of a sub-image corresponding to one primary color, called monochromatic sub-image, for each of the imagers of the system and for transmitting to each of the imagers of the system the associated monochromatic sub-image, the selected primary color depending on the color of the monochromatic beam illuminating the imager at a given moment in time.

4. LIST OF FIGURES

The invention will be better understood, and other features and advantages will become apparent upon reading the description that follows which makes reference to the appended drawings, in which.

5. DETAILED DESCRIPTION OF THE INVENTION

The general principle of the invention therefore rests on the implementation, within the same projection system, of several imagers each illuminated by an illumination beam produced by one and the same polychromatic source beam.

Figure 2:
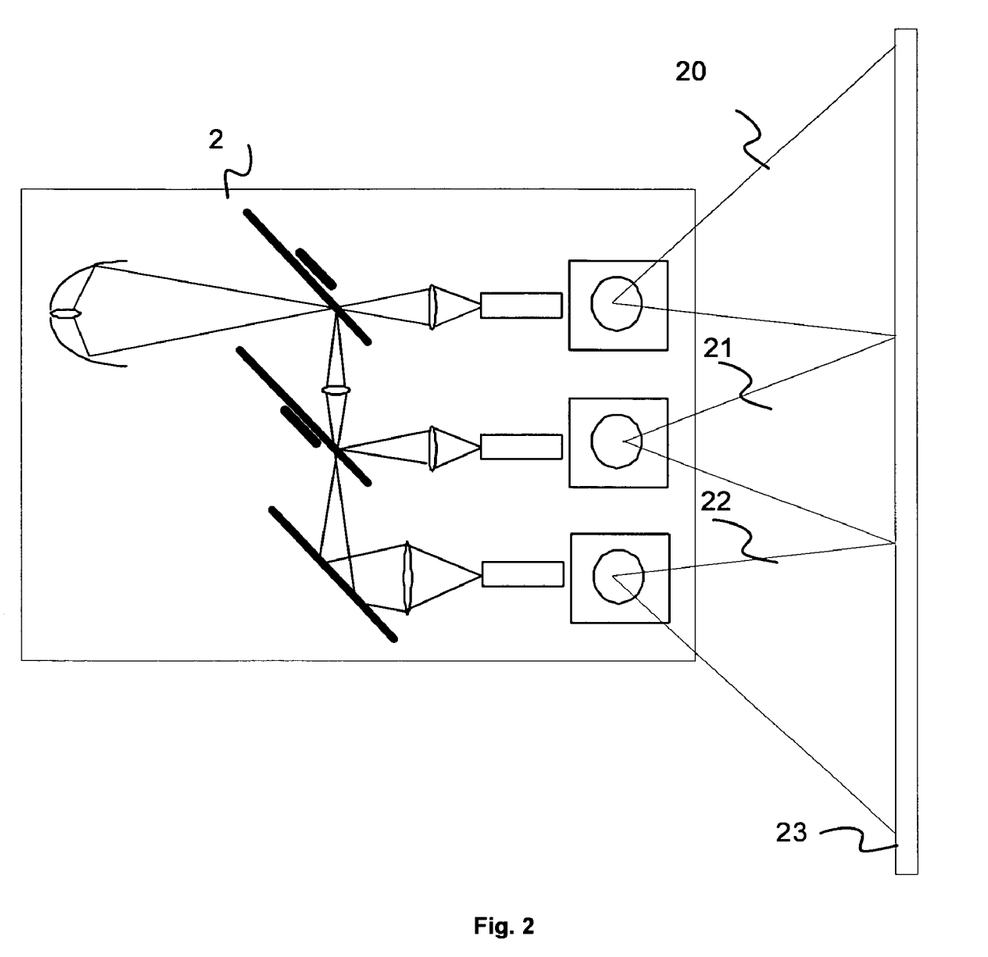
FIG. 2 is a very schematic diagram of a projection system according to the invention.

FIG. 2 is a very schematic layout of a projection system according to the invention which comprises:

a projection device 2 comprising a lamp 40; and a projection screen which defines a projection surface 23.

In order to facilitate the reading of FIG. 2, the scales and the projection angles are not respected between the screen 23 of large size and the device 2 of small size which is situated at several meters from the screen 23.

The projection device 2 projects a segmented image onto the projection surface 23 by emitting three separate imaging beams 20 to 22. The projection surface is of large size and may be adapted to various types of projection of the movie theatre type. It is, for example, plane, or virtually plane (with a slight curvature, cylindrical or spherical, in order to avoid distortion).

Figure 3:
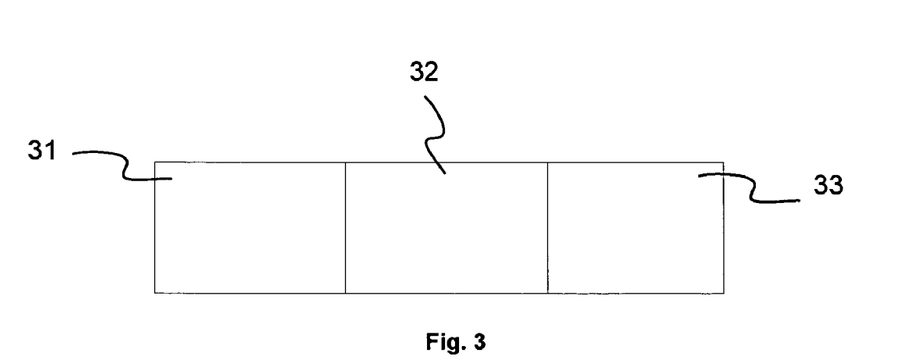
FIG. 3 shows an image projected onto a screen by the system in FIG. 2.

The segmented image such as is illustrated in FIG. 3 comprises three adjacent parts 31 to 33 respectively obtained from the imaging beams 20 to 22. For a uniform source image, thanks to the invention, the three parts 31 to 33 exhibit uniform colors and a uniform brightness that remains uniform over time, even when the lamp 40 begins to age.

Figure 4:
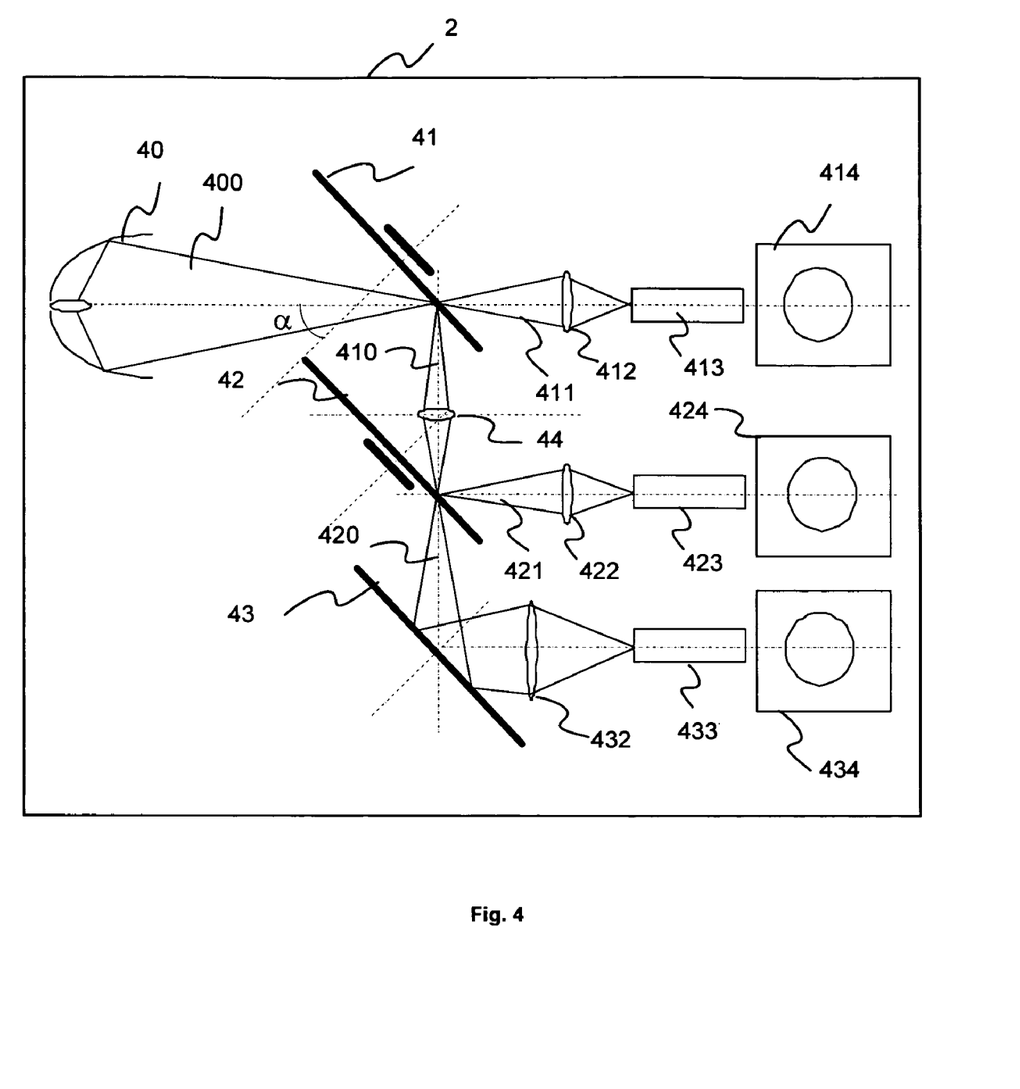
FIG. 4 describes a projection device of the system in FIG. 2.

FIG. 4 illustrates, in more detail, the device 2 which comprises a lamp 40 and an imaging assembly.

The imaging assembly itself contains:

a first colored wheel 41;

a focusing lens 44;

a second colored wheel 42;

a mirror 43;

three focusing lenses 412, 422 and 432;

three light guides 413, 423 and 433; and three imagers 414, 424 and 434.

The lamp 40 with elliptical reflector emits a polychromatic source beam 400 focused onto the colored wheel 41. The lamp 40 is, for example, of the Xenon type which has the advantage of having a temperature equal to 6500° (close to that of the sun) and a relatively flat spectrum. Nevertheless, any type of lamp emitting polychromatic light designed for large-screen projection may be used. In order to obtain a uniform spectral distribution (especially in the case where a lamp that is not of the Xenon type is used), a notch filter can be placed between the lamp and the first colored wheel.

The colored wheel 41 is illuminated by the polychromatic source beam 400. The colored wheel 41 is inclined with respect to the axis of the beam 400 at an angle ☐ that allows, according to the properties of the colored wheel 41, the beam to be spatially separated into two beams. This angle ☐ can take any value between 25° and 65°. Preferably, this angle ☐ is equal to 45°. Thus, the colored wheel 41 separates the beam 400 into a first monochromatic beam 411 (in other words which comprises a single primary color—red, green or blue) and into a two-tone beam 410 (in other words that comprises two primary colors—red, green or blue).

The lens 44 then focuses the two-tone color 410 onto the colored wheel 42 which is inclined with respect to the axis of the beam 410, at an angle that allows the beam, according to the properties of the colored wheel 42, to be spatially separated into two monochromatic beams 420 and 422. Preferably, this angle is equal to 45°.

The lenses 412, 422 and 432 respectively focus the beams 411, 421 and 420 onto the entry of the light guides 413, 423 and 433.

The light guides 413, 423 and 433 are for example integrating bars or hollow guides with reflecting sidewalls.

The exits of the light guides 413, 423 and 433 are preferably situated in the same plane and are respectively placed on the entries of optical motors respectively comprising the imagers 414, 424 and 434 which respectively produce the beams 20 to 22. Each optical motor comprises a lens that images the exit of the associated light guide 413, 423 or 433 onto the corresponding imager and an objective lens allowing the projection onto a screen. The optical motors are arranged in such a manner that the images 31 to 33 are projected very precisely side by side onto the projection surface 23. According to a first configuration, the axis of the objective lenses of the optical motors is shifted with respect to the axis of the associated imager, the axes of the objective lenses and of the imagers remaining parallel, which allows the image beams created by each of the imagers to be oriented. According to a second configuration, the objective lenses undergo a tilt in such a manner that the axes of the objective lenses are oriented in the direction of projection.

The imagers 413, 423 and 433 are, for example, of the DMD (Digital Micro-mirrors Device from Texas Instruments®) type that are insensitive to the polarization. They may also be of the transmissive LCD (Liquid Crystal Display) or LCOS (Liquid Crystal On Silicon) type. In the case where LCDs or LCOSs are used, means designed to recover the polarization are preferably placed between the light guides and the imagers. These are controlled by control means which allow the image to be projected to be created in the form of three parts 31 to 33.

Figure 5:
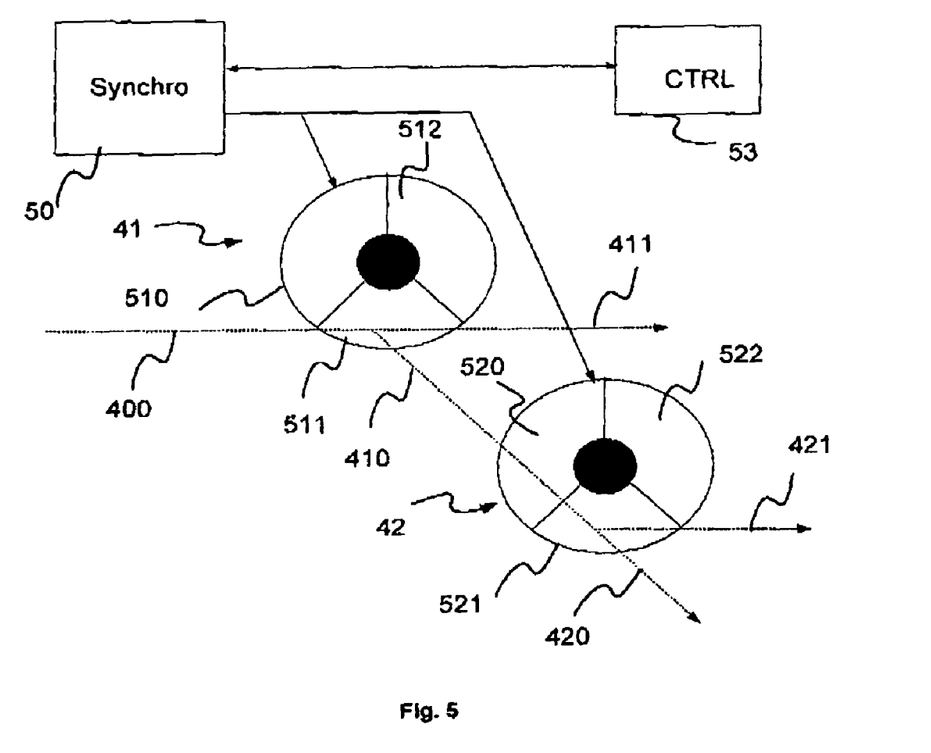
FIG. 5 illustrates the implementation of colored wheels within the system according to FIG. 2.

According to the invention, the wheels 41 and 42 are synchronized such that, at any given moment, the imagers 413, 423 and 433 are illuminated by three different colored beams 411, 421 and 420. Thus, FIG. 5 illustrates the synchronization of the wheels 41 and 42.

The wheels 41 and 42 each comprise three segments which reflect or transmit separate colors toward an imager. Thus, the wheel 41 (or 42, respectively) comprises three segments 510 to 512 (or 520 to 522, respectively).

The segments 510 to 512 respectively transmit red, green and blue and therefore respectively reflect cyan (mixture of blue and green), magenta (mixture of blue and red) and yellow (mixture of green and red). They therefore contain filters allowing two different colors to be reflected.

The segments 520 to 522 respectively transmit green, blue and red and therefore respectively reflect magenta, yellow and cyan. They therefore contain filters allowing two different colors to be reflected.

Synchronization means 50 position the colored segments in such a manner that, at any given moment, the colored wheel 42 transmits one of the colors of the two-tone beam 410 and reflects the second color of the beam 410. Furthermore, control means 53 for the imagers 414, 424 and 434, defining the color projected for each of these imagers, cooperate with the synchronization means 50 so that, at any given moment, the color of the image part projected by an imager corresponds to the color of the beam illuminating this imager.

The three beams 411, 421 and 420 entering into the light guides are of different colors—red, green or blue. In addition, as the wheels turn, in the same sequence, the three imagers 414, 424 and 434 are successively illuminated by the three colors. In this way, a high optical efficiency is obtained and there is very little loss of light in the illumination beam. Moreover, the image parts 31, 32 and 33 are uniform since the monochromatic illumination beams illuminating the imagers are produced by one and the same source. The control of the brightness is simplified since it suffices to act on a single source.

By way of example, the colored wheel 41 allows a sequence red (R), green (G), blue (B), denoted as RGB, in the transmitted beam 411 when the beam 400 successively illuminates the segments 510, 511 and 512. In a synchronous manner, the colored wheel 42 allows a sequence BRG (Blue-Red-Green) in the transmitted beam 421 (obtained by reflection of the beam 410) and a sequence GBR (Green-Blue-Red) in the reflected beam 420 (obtained by reflection of the beam 410) when the beam 400 successively illuminates the segments 520, 521 and 522. It goes without saying that, according to one variant of the invention (implementing a different direction of rotation or a different order of the segments 520 to 522), the colored wheel 42 can transmit the sequence GBR and reflect the sequence BRG when the wheel 41 transmits the sequence RGB, this configuration allowing three different colored beams at the entry of the imagers 414, 424 and 434.

According to one variant embodiment, the segments 520 to 512 respectively transmit yellow, cyan and magenta and therefore respectively reflect blue, red and green. They therefore contain filters allowing one color to be reflected which has the advantage of being simpler to implement since this is a narrow-band reflective filter reflecting a single color (and not a filter with two narrow bands or a single wideband filter). Since the wheels are perfectly synchronized, the result is the same as before since the beam 410 is two-tone and each of the segments now transmits only one color and reflects only one color (by way of example, the segment 520 transmitting yellow receives a beam 410 comprising green and blue; it therefore transmits green and reflects blue in the same way as would a segment only transmitting green).

Figure 10:
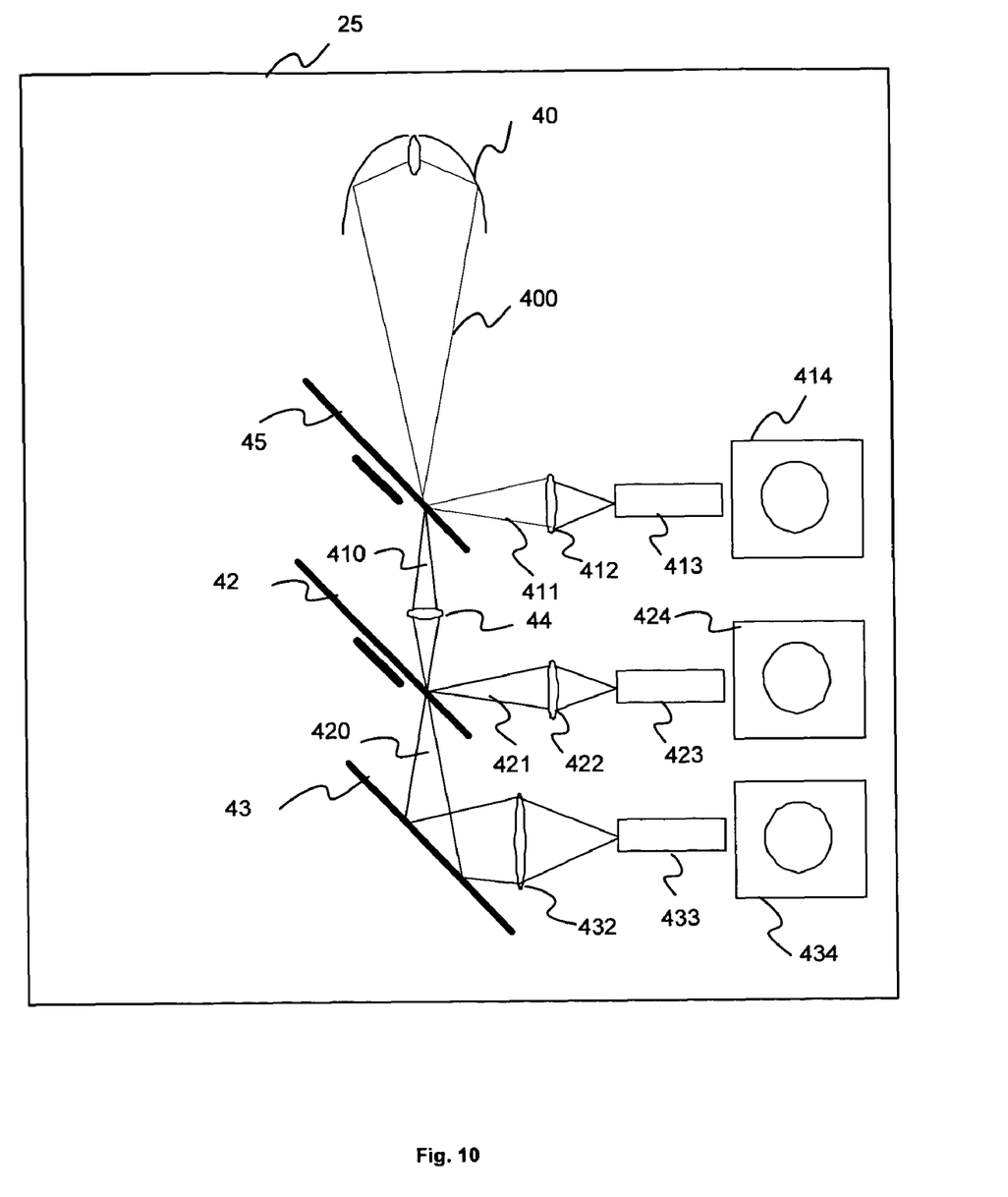
FIG. 10 describes another variant of the invention.

According to one variant of the invention illustrated in FIG. 10, a projection device 25 is implemented that has a structure according to which the colored wheel 41 is replaced by a colored wheel 45 that reflects a single color, the lamp 40 being positioned in a suitable manner. The colored wheel 45 transmits a beam 410 toward the colored wheel 42 which is synchronized with the colored wheel 41 so as to transmit only one color from the incident beam 410 and to reflect only one color as described hereinabove in regard to FIG. 9. By way of illustration, the colored wheel 45 transmits a sequence RGB toward the imager 414 whereas, in a synchronous manner, the colored wheel 42 transmits sequences BRG or GBR toward the imagers 424 or 434.

The device 25 furthermore comprises the same elements as the device 2, which carries the same references and will not therefore be described further.

The structure of the device 25 has the advantage of implementing two colored wheels that reflect a single color. They can therefore be identical and comprise monochromatic narrow-band filters, which are particularly advantageous (simplicity of manufacture, high efficiency).

Figure 11:
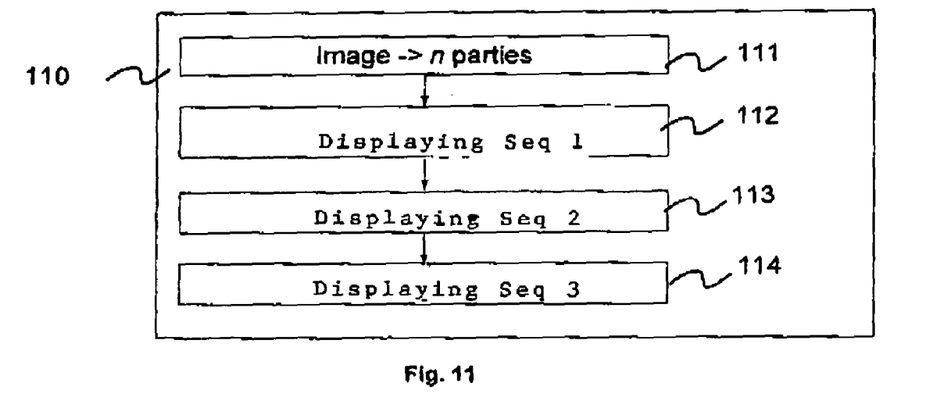
FIG. 11 shows an image management method implemented in the devices according to FIGS. 2, 6 and 10.

FIG. 11 illustrates a management algorithm 110 for an image to be projected that is implemented in the control means 53. This algorithm notably provides steps for dividing up each image implemented by separation means and steps for selecting information representative of one sub-image corresponding to a primary color implemented by corresponding means. These means are, for example, material means of the ASIC type or dedicated software means stored in a memory and implemented on a microprocessor.

The image separation means can be implemented, according to the invention, within the projection device or upstream of it, the signal entering into the projection device separating the sub-images.

When an image needs to be projected, during a step 111, the control means separate (or divide) the image into p parts corresponding to the number of projected adjacent sub-images (imagers being implemented in parallel by the projection device), the division being applied depending on the position and on the format of the imagers (for example, division of the image into three adjacent bands in 16/9 format such as is shown in FIG. 3 if the projection device comprises imagers in 16/9 format placed side by side) in order to obtain three independent sub-images (or at least information representative of these sub-images). The device 2 comprises three imagers displaying three image parts of the same size. The management algorithm applied to this device therefore divides an image into three equal parts corresponding to the parts to be displayed 31 to 33.

Then, during a step 112, the control means 53 select and transmit the information for each of the three sub-images corresponding to a first color to be displayed to an associated imager (the sub-images corresponding to the parts 31 to 33 are respectively displayed by the imagers 414, 424 and 434). Furthermore, the control means 53 control the colored wheels 41 and 42 and hence the colors of the illumination beams illuminating the imagers (or, according to one variant, receive information indicating the position of the colored wheels and deduce from this these illumination beam colors). According to a previously described example, the beams 400, 421 and 420 respectively correspond to sequences RGB, BRG and GBR. In addition, during the step 112, the first sub-image is red, the second blue and the third green (first colors of the beams illuminating the imagers 414, 424 and 434). The management means 53 then control the imagers 414, 424 and 434 as a function of the color of the monochromatic sub-images to be displayed at any given moment.

Subsequently, during a step 113, the management means 53 control the imagers 414, 424 and 434 so as to respectively display sub-images corresponding to the second colors of the beams illuminating the imagers, being, according to the aforementioned example, first, second and third monochromatic sub-images that are green, red and blue, respectively.

Then, during a step 114, the management means 53 control the imagers 414, 424 and 434 so as to respectively display sub-images corresponding to the third colors of the beams illuminating the imagers, being, according to the aforementioned example, first, second and third monochromatic sub-images that are blue, green and red, respectively.

The transitions between two colors of a beam illuminating an imager could be processed according to suitable methods: for example, absence of display during the transitions, or, on the contrary, use of the transitions for displaying non-saturated colors that depend on the two colors corresponding to the transition.

Figure 12:
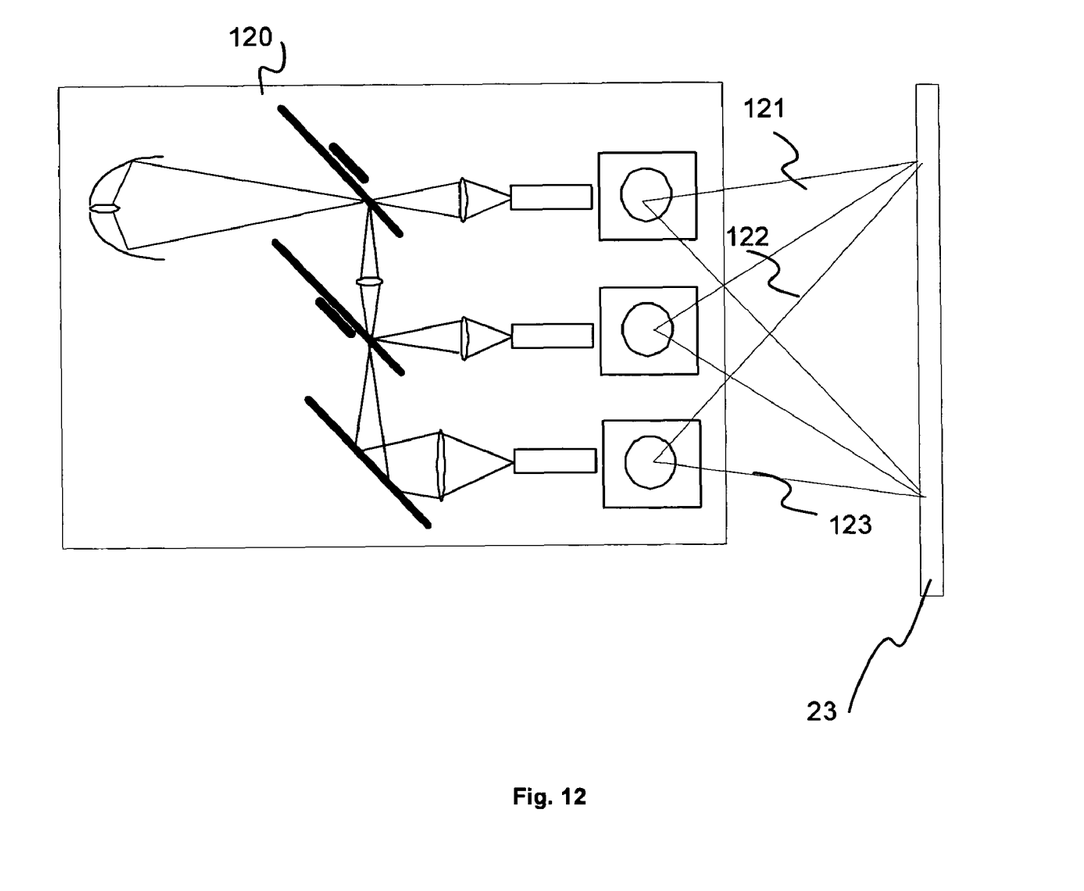
FIG. 12 illustrates one variant of the invention allowing a high-resolution image projection.

FIG. 12 shows a high-resolution projector 120 according to one variant of the invention (the scales and projection angles are not respected between the large-sized screen 23 and the projector 120 of small size which is situated at several meters from the screen).

The projector 120 is very similar to the projector 2, with the exception of the optical motors and of the image separation and selection means that are configured in such a manner that the monochromatic sub-images created by the imagers 414, 424 and 434 are exactly superimposed. Indeed, the optical motors are configured according to one of the methods previously presented and applied to the projector 2 (for example, shift between axes of each objective lens and of the associated optical motor or rotation of the axes of the objective lenses) so that the monochromatic beams, of different colors at any given moment and representative of the image to be projected, illuminate the same part of the screen 23. Thus, in the projection plane, the three beams 121 to 123 are superimposed.

Figure 6:
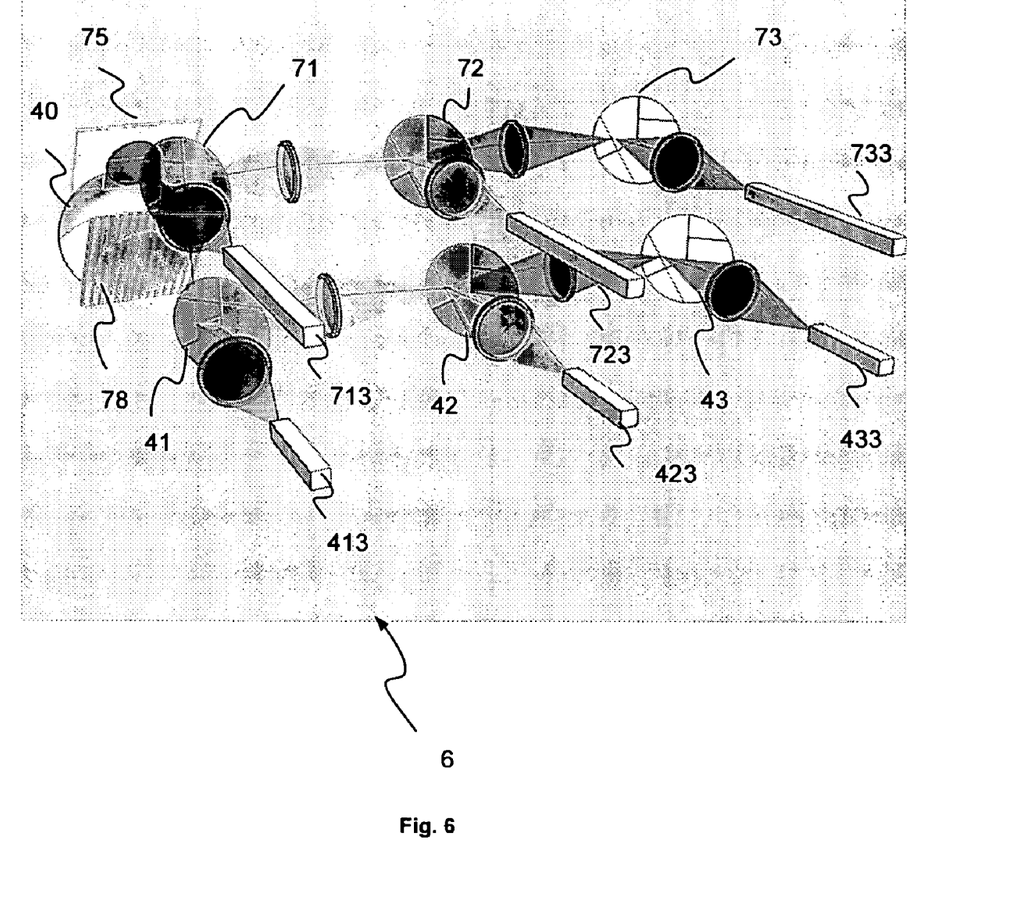
FIGS. 6, 7A, 7B and 8 show a variant of the invention and FIG. 9 a corresponding projected image.

FIG. 6 shows a perspective view of a projection device 6 according to one variant of the invention.

Figure 9:
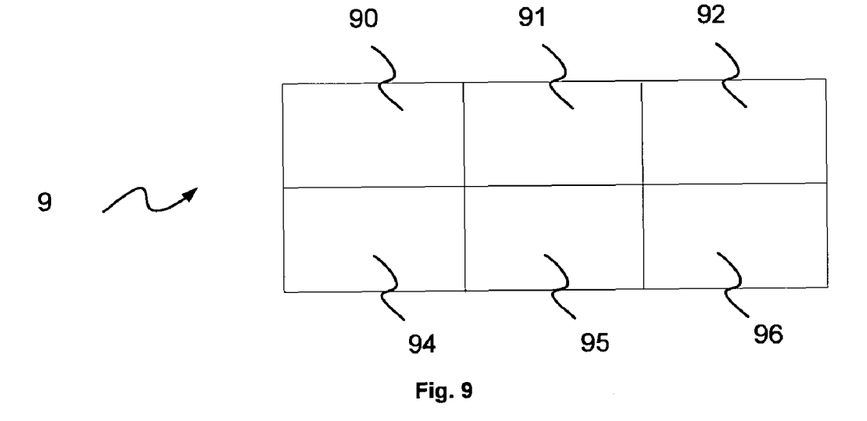

The device 6 allows an image 9 to be projected, as is illustrated in FIG. 9, which is divided into six parts with one sub-assembly of three upper parts 90 to 92 and one sub-assembly of three lower parts 94 to 96. These two sub-assemblies are respectively created by means of first and second imaging assemblies illustrated in FIGS. 7A and 7B, respectively.

The image 9 thus generated has the advantage of being uniform.

Certain elements of the projection device 6 are very similar to elements of the device 2 and will not therefore be described further.

In its lower part, the projection device 6 comprises:
a lamp 40;
separation means 78; and
a first imaging assembly 76.
In its upper part, the projection device 6 comprises:
a totally reflecting mirror 75; and
a second imaging assembly 77.

Figure 8:
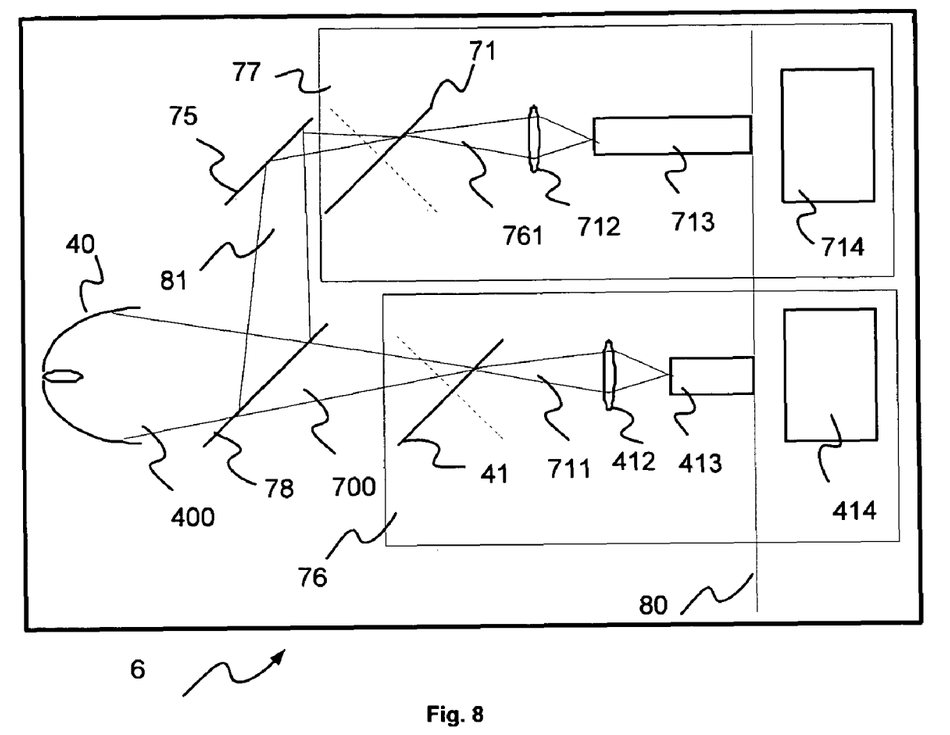

The separation means 78 separate the polychromatic source beam 400 generated by the lamp 40 into two beams 700 and 81 such as is illustrated by the side view in FIG. 8.

According to a first embodiment, the separation means 78 are of the polarization means type, preferably of the grating polarizer type (for example Moxtek®) which can be inclined between 25° and 70° with respect to the axis of the beam 400. According to one variant, the polarizer is of the PBS (Polarization Beam Splitter) type. In this case, the polarizer is inclined with an angle close to 45° with respect to the axis of the beam 400.

According to a second embodiment, the separation means 78 are of the semi-transparent mirror type. Preferably, the mirror comprises two parts, that are respectively reflecting and transparent, which can be more or less interlaced (for example, 'dot mirrors'), the reflecting part representing half of the surface area of the mirror. According to one variant, the mirror comprises a special treatment that allows 50% of the incident flux to be reflected and the remaining 50% to be transmitted. Thus, the beam 400 is divided into two beams 70 and 81 of equal, or very similar, brightness.

Figure 7A:
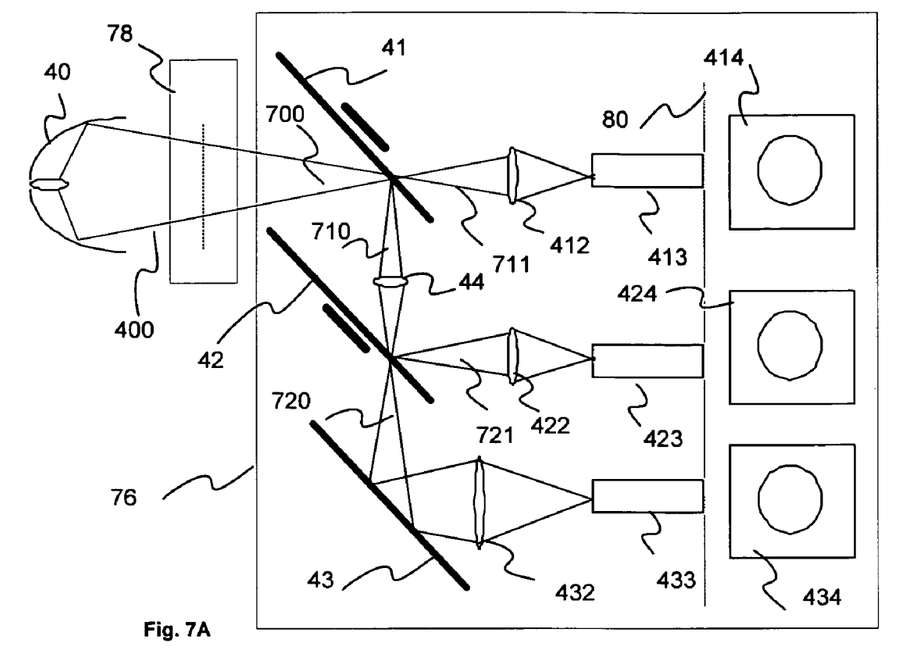
Figure 7B:
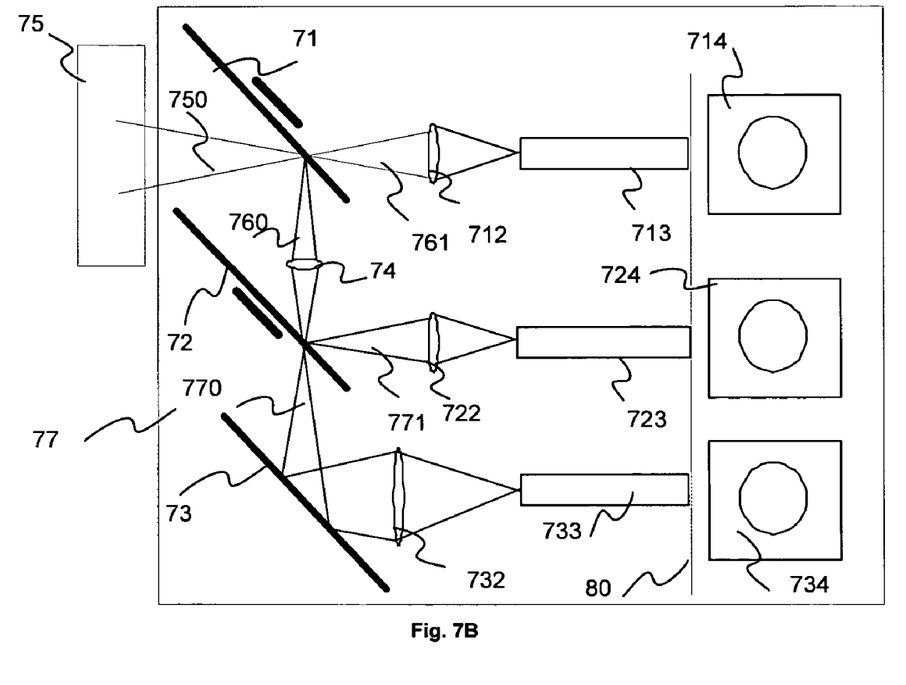

The second imaging assembly 77 is very similar to the first imaging assembly 76.

It notably comprises:
two colored wheels 71 and 72 (which replace the wheels 41 and 42);
a focusing lens 74 (replacing the lens 44);
a mirror 73 (replacing the mirror 43) that reflects the beam 81 toward the wheel 71;
three focusing lenses 712, 722 and 732 (replacing the lenses 412, 422 and 432);
three light guides 713, 723 and 733; and
three imagers 714, 724 and 734 (replacing the imagers 414, 424 and 434), It will be noted that the separation means 78 and the mirror 75 allow the beam 81 to be focused onto the colored wheel 71. Furthermore, the light guides 713, 723 and 733 are preferably longer than the light guides 413, 423 and 433, such that the exits of all the guides are in the same plane 80.

The colored wheels 71 and 72 are synchronized to one another in such a manner that the images 714, 724 and 734 are illuminated, at any given moment, by three monochromatic beams 761, 771 and 770 of different colors, each of the beams sequentially illuminating the imager associated with it with three different colors.

Preferably, but not necessarily, the wheels 71 and 72, on the one hand, and 41 and 42, on the other, are synchronized in such a manner that the changes of segments illuminated by an incident illumination beam occur at the same moment. Thus, the control of the imagers 414, 424, 434, 714, 724 and 734 is facilitated.

The second embodiment is especially well adapted to a use of imagers that are insensitive to polarization such as DMDs. Nevertheless, the use of LCOS and LCD techniques is also possible with recovery of polarization similar to that implemented for the device 2.

The first embodiment is especially well adapted to a use of imagers operating with polarized light. Each of the imagers 414, 424, 434, 714, 724 and 734 is of course correctly oriented with respect to the incident monochromatic illumination beam. Since the polarizations are different in the imaging assemblies 76 and 77, polarization rotation means (for example a □/2 plate) may be placed in one of the imaging assemblies (in order to rotate the polarization and maintain the same orientations of the imagers in the two assemblies 76 and 77) preferably before the first colored wheel or between the light guides and the imagers of this assembly.

According to one variant of the second embodiment implementing three imaging assemblies similar to the assembly 76, first separation means are used that reflect two thirds of the incident flux and transmits one third of the flux (the separation means are then, for example, of the 'dot mirrors' type with a reflecting surface area representing two thirds of the total surface area). The transmitted beam then illuminates a first imaging assembly. The reflected beam then illuminates second separation means that separate the incident beam into two polychromatic beams. Each of these beams then illuminates one of the two other imaging assemblies. The image obtained on the projection surface then comprises nine adjacent parts of uniform brightness.

According to the same principle, variants of the invention implement 3n imagers (n being greater than or equal to 2 and being for example 2, 3, 4, . . . ), the polychromatic source beam being separated by partially transparent mirrors into n polychromatic source beams of substantially equal brightness, each of the n beams illuminating an imaging assembly. The projected image then comprises 3n parts of uniform brightness.

According to other variants, the first and second embodiments are combined by implementing, for example, 6n imagers: an unpolarized polychromatic source beam is separated into 6n polarized polychromatic beams by separation suitable means (for example, a polarizer separates the source beam into two polarized beams that are each separated into n polychromatic polarized beams; an implementation of n mirrors may also be envisioned that separate the source beam into n unpolarized beams, each of which illuminates a polarizer allowing 6n polarized polychromatic beams to be obtained), the 6n polarized polychromatic beams each illuminating an imaging assembly.

It goes without saying that the invention is not limited to the embodiments described hereinabove.

Those skilled in the art will notably be able to envision any type of lamp designed for large-screen projection.

Similarly, numerous types of separation means, lenses, guides, colored wheels and optical motors are compatible with the invention.

Furthermore, the structure itself of the projection system may be modified while at the same time remaining within the scope of the invention. Thus, the projected image can be of variable shape with, for example, parts whose length direction is horizontal or vertical, which can be placed adjacent to one another, one above the other and/or side by side.

The colored wheels are, according to the invention, used in transmission and in reflection mode and can, according to various variants, either reflect or transmit a primary color.

According to another variant of the invention, the polychromatic beam is separated into three monochromatic beams such as is described in the projector 2 described with regard to FIG. 2. According to this variant, each of the monochromatic beams is separated into several beams (for example 2, 3, 4, . . . ) by separation means of the polarizer or semi-transparent mirror type (treated mirrors or dot mirrors) each illuminating an imager. The separation means are placed in the path of the monochromatic beams (for example between one of the colored wheels 41 and 42 or the mirror 43 and the entry of the corresponding waveguide). Focusing lenses could also be added if necessary. This embodiment allows a projected image to be obtained in 3, 6, 9, 12 parts or more, with simply two colored wheels.

According to yet another variant of the invention, the embodiments illustrated in FIGS. 6 and 12 are combined. A projector with several stages may thus be obtained that projects sub-images with three colors, at any given moment, which are superimposed, each of the corresponding stages having an imaging assembly generating three monochromatic sub-images that are superimposed.

According to other variants of the invention, the embodiments illustrated in FIGS. 6 and 12 are combined with the embodiment described in FIG. 10, the projection system then implementing colored wheels each reflecting a monochromatic beam.

The invention claimed is:

1. A projection system comprising a light source capable of generating a polychromatic source illumination beam, wherein it comprises a group of at least one imaging assembly,
    each of said imaging assemblies of said group being illuminated by an associated polychromatic illumination beam, and comprising:
        two separate colored wheels, respectively called first and second colored wheels; and
        three separate imagers, respectively called first, second and third imagers;
    at least one part of the polychromatic beam, called first source beam, illuminating said first colored wheel which separates said source beam into a first monochromatic beam and into a two-tone beam, said first monochromatic beam illuminating the first imager and said two-tone beam being transmitted toward said second colored wheel; and
    said second colored wheel being illuminated by said two-tone beam and separating said two-tone beam into second and third monochromatic beams, respectively illuminating said second and third imagers,
wherein said imaging assembly comprises focusing means in each of the paths of said first, second and third monochromatic beams,
said focusing means each comprising a group of at least one lens and one light guide, each of the groups of at least one lens respectively focusing the first, second and third monochromatic beams onto the entry of the corresponding light guide, the exit of each of the light guides being respectively associated with the first, second and third imagers.

2. The system as claimed in claim 1, wherein said imaging assembly comprises a group of at least one lens in the path of said two-tone beam, said group of at least one lens focusing said two-tone beam onto said second colored wheel.

3. The system as claimed in claim 1, wherein said group of at least one imaging assembly comprises at least two imaging assemblies and polarization means separating said polychromatic source illumination beam into two separate polychromatic illumination beams respectively illuminating separate imaging assemblies.

4. The system as claimed in claim 1, wherein said group of at least one imaging assembly comprises at least two imaging assemblies and semi-transparent mirrors separating said polychromatic source illumination beam into at least two separate polychromatic illumination beams respectively illuminating separate imaging assemblies.

5. The system as claimed in claim 4, wherein said semi-transparent mirrors are mirrors comprising reflecting regions and transparent regions.

6. A projection system comprising a light source capable of generating a polychromatic source illumination beam, wherein it comprises a group of at least one imaging assembly,
    each of said imaging assemblies of said group being illuminated by an associated polychromatic illumination beam, and comprising:
        two separate colored wheels, respectively called first and second colored wheels; and
        three separate imagers, respectively called first, second and third imagers;
    at least one part of the polychromatic beam, called first source beam, illuminating said first colored wheel which separates said source beam into a first monochromatic beam and into a two-tone beam, said first monochromatic beam illuminating the first imager and said two-tone beam being transmitted toward said second colored wheel; and
    said second colored wheel being illuminated by said two-tone beam and separating said two-tone beam into second and third monochromatic beams, respectively illuminating said second and third imagers,
wherein at least one of said imaging assemblies of said group contains first, second and third optical motors respectively comprising the first, second and third imagers and first, second and third objective lenses, said imagers and lenses being positioned in such a manner as to project three images side by side onto a given projection surface.

7. A projection system comprising a light source capable of generating a polychromatic source illumination beam, wherein it comprises a group of at least one imaging assembly,
    each of said imaging assemblies of said group being illuminated by an associated polychromatic illumination beam, and comprising:
        two separate colored wheels, respectively called first and second colored wheels; and
        three separate imagers, respectively called first, second and third imagers;
    at least one part of the polychromatic beam, called first source beam, illuminating said first colored wheel which separates said source beam into a first monochromatic beam and into a two-tone beam, said first monochromatic beam illuminating the first imager and said two-tone beam being transmitted toward said second colored wheel; and said second colored wheel being illuminated by said two-tone beam and separating said two-tone beam into second and third monochromatic beams, respectively illuminating said second and third wherein said projection system also comprises:

means for dividing up each image to be projected into sub-images, each of the sub-images being associated with an imager of said system; and means for selecting information representative of a sub-image corresponding to one primary color, called monochromatic sub-image, for each of the imagers of said system and for transmitting to each of the imagers of said system said associated monochromatic sub-image, the selected primary color depending on the color of the monochromatic beam illuminating said imager at a given moment in time.

* * * * *